United States Patent
Van Houten

(10) Patent No.: US 6,517,168 B1
(45) Date of Patent: Feb. 11, 2003

(54) WHEEL COVER HAVING INTERCHANGEABLE TURBINE POCKET INSERTS

(75) Inventor: Garry Van Houten, Middleville, MI (US)

(73) Assignee: Lacks Industries, Inc., Grand Rapids, MI (US)

(*) Notice: Subject to any disclaimer, the term of this patent is extended or adjusted under 35 U.S.C. 154(b) by 0 days.

(21) Appl. No.: 09/874,775

(22) Filed: Jun. 5, 2001

(51) Int. Cl.[7] ............................................... B60B 7/00
(52) U.S. Cl. ............................ 301/37.42; 301/37.101
(58) Field of Search ....................... 301/37.101, 37.26, 301/37.63, 37.28, 37.39, 37.42

(56) References Cited

U.S. PATENT DOCUMENTS

| | | | | |
|---|---|---|---|---|
| 655,393 | A | * 8/1900 | Coleman | 301/37.1 |
| 2,392,634 | A | * 1/1946 | Bierman | 301/37.1 |
| 2,629,957 | A | 3/1953 | Lyon | |
| 2,640,730 | A | 6/1953 | Lyon | |
| 2,994,979 | A | 8/1961 | Shoemaker | |
| 3,287,067 | A | 11/1966 | Brown | |
| 3,337,271 | A | * 8/1967 | Lyon | 301/37.1 |
| 3,367,722 | A | * 2/1968 | Miyanaga | 301/37.1 |
| 3,481,652 | A | * 12/1969 | Mazerolle | 301/37.1 |
| 3,579,408 | A | 5/1971 | Dowhan | |
| 3,602,550 | A | 8/1971 | Patane et al. | |
| 3,791,336 | A | 2/1974 | Zdebski | |
| 3,791,700 | A | 2/1974 | Golze | |
| 3,860,295 | A | 1/1975 | Beisch | |
| 4,209,230 | A | 6/1980 | Perkins | |
| 4,235,476 | A | * 11/1980 | Arvidsson | 301/37.1 |
| 4,295,685 | A | 10/1981 | Spisak | |
| 4,316,637 | A | * 2/1982 | Reynolds et al. | 301/37.1 |
| 4,317,597 | A | * 3/1982 | Golata et al. | 301/37.1 |
| 4,441,762 | A | 4/1984 | Segal | |
| 5,058,959 | A | * 10/1991 | Miles et al. | 301/37.1 |
| 5,078,453 | A | * 1/1992 | Siwek | 301/37.1 |
| D332,441 | S | * 1/1993 | Douglas, Jr. | D12/204 |
| 5,188,429 | A | * 2/1993 | Heck et al. | 301/37.1 |
| 5,286,092 | A | * 2/1994 | Maxwell, Jr. | 301/37.1 |
| 5,441,334 | A | * 8/1995 | Botterman et al. | 301/37.1 |
| 5,443,582 | A | * 8/1995 | Ching | 301/37.37 |
| 5,458,401 | A | * 10/1995 | Baccman | 301/37.1 |
| 5,505,525 | A | 4/1996 | Denton | |
| 5,667,281 | A | * 9/1997 | Ladouceur | 301/37.1 |
| 5,820,225 | A | 10/1998 | Ferriss et al. | |
| 5,988,762 | A | 11/1999 | Asada et al. | |

* cited by examiner

Primary Examiner—S. Joseph Morano
Assistant Examiner—Long Bae Nguyen
(74) Attorney, Agent, or Firm—Vanophem & Vanophem, P.C.

(57) ABSTRACT

A wheel cover assembly having an array of pocket inserts correspondingly disposed within an array of turbine pockets of a wheel cover for providing multitudes of different decorative wheel appearances. The pocket inserts are fastened to the wheel cover using an integral snap tab arrangement including integral snap tabs that extend in an inboard direction from the inboard surface of the wheel cover and that are disposed around each turbine pocket. The pocket inserts include integral snap tabs, corresponding to the integral snap tabs of the wheel cover, that extend in an inboard direction from an inboard surface of the pocket insert, and thereby interlock with the integral snap tabs of the wheel cover to retain the pocket inserts within the turbine pockets of the wheel cover. Surface treatments of the wheel cover and pocket inserts can be varied to provide a contrasting decorative appearance across the wheel cover assembly.

18 Claims, 3 Drawing Sheets

WHEEL COVER HAVING INTERCHANGEABLE TURBINE POCKET INSERTS

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to vehicle wheel ornamentation. More specifically, this invention relates to a wheel cover assembly having interchangeable inserts snapped into turbine pockets of a wheel cover, so as to provide a variety of decorative contrasts between the turbine pockets and the rest of the vehicle wheel cover.

2. Description of the Related Art

The prior art includes various decorative wheel cover assemblies that are important to the side profile appearance of an automobile. Because wheels represent such a large portion of the surface area of the side profile of a vehicle, it is increasingly desirable to provide vehicle purchasers with a variety of interchangeable decorative appearances for vehicle wheels. On some vehicles, the wheel surface area can constitute over 20% of the overall side profile surface area, thus underscoring the need for a variety of wheel decorating options.

One approach to incorporating decorative wheel cover assemblies that are pertinent to the present invention involves using centrally mounted inserts. For example, U.S. Pat. No. 2,629,957 to Lyon teaches the use of a snap-on reflector insert that is interlocked within a central aperture of a wheel cover. The wheel cover includes the central aperture that is defined by an annular edge and a plurality of U-shaped spring fingers extending laterally behind the annular edge and terminating in free ends. The snap-on reflector insert is snapped past the spring fingers such that a first shoulder mounts flush with the annular edge of the wheel cover, and a second shoulder mounts against and is gripped by the free ends of the spring fingers. Accordingly, the spring fingers exert a resilient force on the snap-on reflector insert to urge it against the annular edge.

A similar wheel cover disclosed in U.S. Pat. No. 2,994,979 to Shoemaker teaches a central medallion that is glued to a wheel cover for ornamentation purposes. The wheel cover includes a depressed central cover area that is defined by a depressed annular channel therearound. Glue is applied to the depressed central cover area and the central medallion is then assembled to the depressed central cover area over the glue, such that excess glue is able to ooze into the depressed annular channel.

Another version of a wheel cover having a centrally mounted insert is disclosed in U.S. Pat. No. 3,860,295 to Beisch that teaches use of a decorative plastic insert that is mounted to a metal wheel cover in a way intended to overcome the disadvantages associated with the Lyon and Shoemaker references. Beisch discloses that the wheel cover has a central seat portion of convex shape that has an annular folded flange around the periphery of the central seat portion. The flange extends radially inwardly and is spaced from the outboard surface of the central seat portion to define an annular groove therebetween. A decorative insert is formed with an outside diameter greater than the inside diameter of the flange but less than the inside diameter of the annular groove. The decorative insert is assembled to the wheel cover by a vacuum tool that deforms the decorative insert. The tool engages the decorative insert so as to temporarily decrease the outside diameter of the decorative insert an amount sufficient to permit it to fit inside of the flange. Thereupon, the tool disengages the decorative insert to restore the outside diameter permitting it to extend into the annular groove, such that it is trapped between the flange and the outboard surface of the central seat portion of the wheel cover. A ring gasket is disposed between the decorative insert and wheel cover to provide a seal therebetween.

Finally, a somewhat related version of a wheel cover having a centrally mounted insert is disclosed in U.S. Pat. No. 5,505,525 to Denton that teaches use of a hubcap for covering a heavy-duty vehicle wheel and for permitting examination of the oil level through the hubcap. Denton discloses that the hubcap is composed of plastic and has a mounting flange portion mounted to the wheel, an end wall portion opposite the wheel, and a conical sidewall portion therebetween. The end wall portion includes an opening therethrough, to which a transparent window insert is molded in-situ using an insert molding method. The transparent window insert includes a center opening therethrough, into which a removable center plug is inserted.

Unfortunately, the above-mentioned Lyon, Shoemaker, Beisch, and Denton references do not disclose structure that is compatible with snap-in inserts for vent openings of a vehicle wheel. Instead, Lyon, Shoemaker, Beisch, and Denton all teach use of a centrally mounted insert to fit within a central aperture or depression of a wheel cover, wherein the insert is interlocked within the central aperture using annular interlocking features, expensive adhesive, or in-situ molding.

A second approach involving decorative wheel cover assemblies involves application of an outboard ornamental skin to an underlying rigid wheel cover. For example, U.S. Pat. No. 4,295,685 to Spisak teaches a wheel trim assembly having a plastic cover with selected portions thereof covered by a thin metal cover so that portions of the wheel trim assembly have a metallic finish and remaining portions have a nonmetallic finish. Spisak addresses the problems associated with providing such finishes on a unitary wheel cover, including masking and painting the wheel cover. Conventional paint masking and resist-paint masking techniques are known to be relatively expensive and difficult to execute on a mass production basis. Accordingly, Spisak discloses a plastic body member that is adapted to cover an outboard face of a wheel. A metal member overlies only certain portions of the plastic body member so as to provide a metallic finish in those portions, and other portions of the plastic body member are left exposed in contrast to the metallic finish for decorative purposes. Specifically, Spisak discloses that the plastic cover has outward primary surfaces and deep recesses defining inward secondary surfaces. The metal cover has an outer surface corresponding to the outward primary surfaces of the plastic cover, and further has vent openings corresponding to the inward secondary surfaces of the plastic cover. The metal cover is sandwiched between the plastic cover and a hubcap that fastens through the metal cover to the plastic cover. Therefore, the wheel trim assembly leaves the secondary surfaces of the plastic cover exposed for contrast with the exposed outer surface of the metal cover.

A remarkably similar configuration is disclosed in U.S. Pat. No. 5,820,225 to Ferriss et al. that teaches a composite applique construction to simulate styling features of aluminum alloy wheels. Ferriss et al. disclose an applique assembly composed of an insert member and an ornamental applique mounted to a vehicle wheel having a spider with alternating spokes and openings therethrough, a rim, and a rim flange. The insert member includes an annular outer insert portion mounted adjacent the rim of the vehicle wheel, and further includes an annular inner insert portion and vent openings therethrough that align between the spokes of the vehicle wheel. A resilient filler is disposed between the spider of the vehicle wheel and the insert member, and an adhesive is disposed between the insert member and the applique. Additionally, the periphery of the applique is interlocked to the rim flange of the vehicle wheel to assist in retaining the applique assembly to the vehicle wheel.

Unfortunately, both the Spisak and Ferriss et al. references involve mounting a large metal appliqué, or skin, on top of an underlying plastic body member to achieve an aesthetic contrast between the appearance of wheel vent openings and the appearance of the outer surface of the wheel cover assembly. This unnecessarily demands manufacture of both plastic and sheet metal wheel components, and therefore complicates manufacturing of the wheel cover assembly.

A final approach to such wheel cover assemblies is disclosed in U.S. Pat. 4,441,762 to Segal that recognizes that ornamental wheel designs of the prior art were not variable or alterable. Therefore, Segal teaches a decorative wheel covering for providing a multiplicity of arbitrarily devised ornamental patterns according to the desire of the user. Segal discloses a wheel cover having a rim for attaching to a wheel, and further discloses a plurality of pie-shaped decorative segments having radially outer portions that attach to the rim of the wheel. The decorative segments are reversible and may include a variety of colors and designs. A two-piece hub sandwiches central portions of the decorative segments to complete the assembly of the wheel cover. Accordingly, different decorative patterns can be created by the user by arbitrarily varying the decorative segments. Unfortunately, the Segal design involves use of no less than eight separate components, including three separate fastening components.

From the above, it can be appreciated that the decorative wheel cover assemblies of the prior art are not fully optimized and include a variety of disadvantages. Therefore, what is needed is a wheel cover that provides unlimited turbine pocket decorating schemes, and includes a separate insert that integrally fastens to a vehicle wheel within a vent opening thereof, and thereby avoids the problems associated with paint masking techniques and the problems associated with the prior art references discussed above.

BRIEF SUMMARY OF THE INVENTION

According to the preferred embodiment of the present invention, there is provided a wheel cover assembly having a wheel cover with turbine pockets disposed in an array about the wheel cover. An insert or pocket insert is disposed in each of the turbine pockets, wherein the surface treatments of the wheel cover and pocket inserts can be varied to provide a contrasting decorative appearance across the wheel cover assembly. The pocket inserts are fastened to the wheel cover using an integral snap tab arrangement including integral snap tabs that extend in an inboard direction from the inboard surface of the wheel cover and that are disposed around each turbine pocket. Moreover, integral stirrups correspond to the integral snap tabs and extend in an inboard direction from an inboard surface of the pocket insert, and thereby interlock with the integral snap tabs of the wheel cover to retain the pocket inserts within the turbine pockets of the wheel cover. Therefore, the present invention sets forth unique structure for integrally fastening a novel turbine pocket insert into a turbine pocket of a wheel cover to provide an unlimited number of decorating themes.

It is an object of the present invention to provide a wheel cover assembly that includes a quick and simple way to provide a variety of decorating schemes for a wheel, wherein it is possible to minimize tooling costs by using common tooling to manufacture a common wheel cover that can be used with a multitude of differently styled turbine inserts.

It is another object to provide a wheel cover assembly that has one basic design configuration for the wheel cover that can be quickly and easily adapted to a multitude of other design configurations simply by interchanging the pocket inserts.

It is a still another object to provide a wheel cover assembly having one wheel cover that has a certain surface treatment, and a variety of selectable pocket inserts that have a different surface treatment to provide a decorative contrast on the outboard surface of the wheel cover assembly.

It is yet another object to provide a unique integral fastening arrangement to fasten a pocket insert within a turbine pocket of a wheel cover.

These objects and other features, aspects, and advantages of this invention will be more apparent after a reading of the following detailed description, appended claims, and accompanying drawings.

BRIEF DESCRIPTION OF THE SEVERAL VIEWS OF THE DRAWINGS

FIG. 5 is an enlarged cross-sectional view of the wheel cover assembly along line 5—5 of FIG. 4.

DETAILED DESCRIPTION OF THE PREFERRED EMBODIMENT

Figure 1:
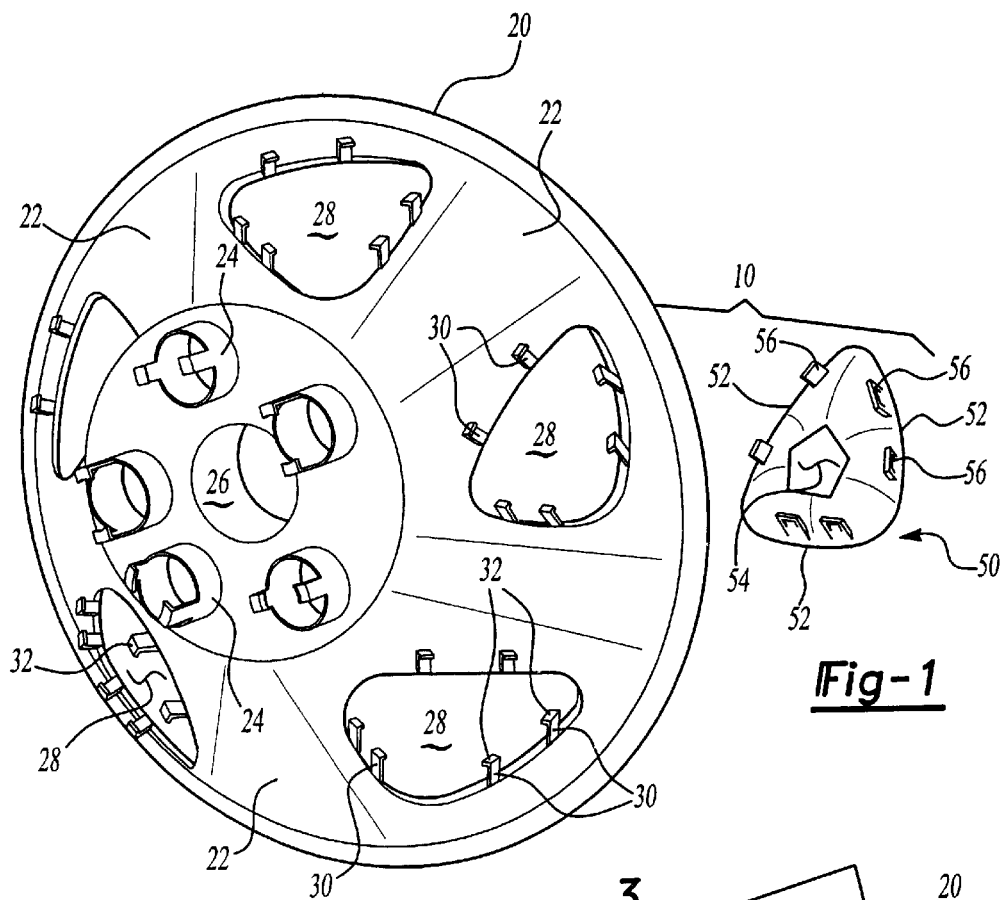
FIG. 1 is an exploded rear perspective view of a wheel cover assembly according to the preferred embodiment of the present invention.

Referring now in detail to the Figures, there is shown in FIG. 1 a wheel cover assembly 10 in accordance with the present invention. The wheel cover assembly 10 generally includes a wheel cover 20, and inserts or pocket inserts 50 assembled thereto. The wheel cover 20 is preferably composed of a plating grade thermoplastic, such as polycarbonate/acrylonitrile-butadiene-styrene (PC/ABS) and is manufactured by any of a number of injection molding processes as are well known in the art. Other materials, however, such as sheet metal or heat-resistant plastic, may be used. Preferably, an outboard surface (not shown) of the wheel cover 20 is plated or painted, for example with an attractive chrome finish.

The wheel cover 20 includes an inboard surface 22 that mounts against an outboard surface of a wheel (not shown) in accordance with any method that is well known in the art. For example, the CHROMTEC® wheel assembly process invented by the assignee hereof could be used, wherein the wheel cover 20 is adhesively attached to a wheel using either or both of a thick foam adhesive and a thin film adhesive. Additionally, the wheel cover 20 could be mechanically fastened to a wheel in accordance with various prior art methods. An array of integral lug towers 24 extend in an inboard direction from the inboard surface 22 of the wheel cover 20, as is well known. As is also well known, a hub aperture 26 extends centrally through the wheel cover 20. Alternatively, the wheel cover 20 need not include the hub aperture 26 and instead may have a solid center. As shown, an array of apertures, vents, or turbine pockets 28 are disposed about the wheel cover 20. The turbine pockets 28 are openings that extend through the wheel cover 20, or alternatively can be closed depressions in one of the inboard or outboard surfaces of the wheel cover 20. The turbine pockets 28 may take on any number of various geometries so that many different ornamental designs can be provided.

Uniquely, the wheel cover 20 is provided with several integral legs or snap tabs 30. The snap tabs 30 are disposed around each turbine pocket 28 and extend in an inboard direction from the inboard surface 22 of the wheel cover 20. Each snap tab 30 terminates with a foot 32 that extends generally inwardly toward the center of each turbine pocket 28. In the alternative situation, if the cover includes closed turbine pockets instead of as shown, then only the feet would extend radially inwardly from inside surfaces of the turbine pocket depression.

The wheel cover assembly 10 further includes an array of the pocket inserts 50 that integrally fasten within the array of turbine pockets 28 of the wheel cover 20, so as to roughly conform to the contour of the wheel cover 20 and provide selective decorative appearances therefor. Although only one pocket insert 50 is illustrated in FIG. 1, the number of pocket inserts 50 preferably corresponds to the number of turbine pockets 28 of the wheel cover 20. The pocket insert 50 is preferably formed from an injection molded thermoplastic such as PC/ABS. The pocket insert 50 includes a circumferential periphery 52 that generally corresponds to the shape of the turbine pockets 28 of the wheel cover 20. The pocket insert 50 also includes a pentagon-shaped aperture 54 therethrough, but other aperture 54 geometries may be used to achieve a multitude of different decorative appearances. Those skilled in the art will quickly recognize that the pocket insert 50 need not include any aperture 54 at all. The pocket insert 50 is provided with several integral snap tabs or stirrups 56 that extend in an inboard direction from the pocket insert 50 and that correspond to the snap tabs 30 of the wheel cover 20. The pocket insert 50 is assembled to the wheel cover 20 in an inboard direction toward the wheel cover 20 and overlaps a portion of an outboard surface 36 (shown in FIG. 3) thereof.

Figure 2:
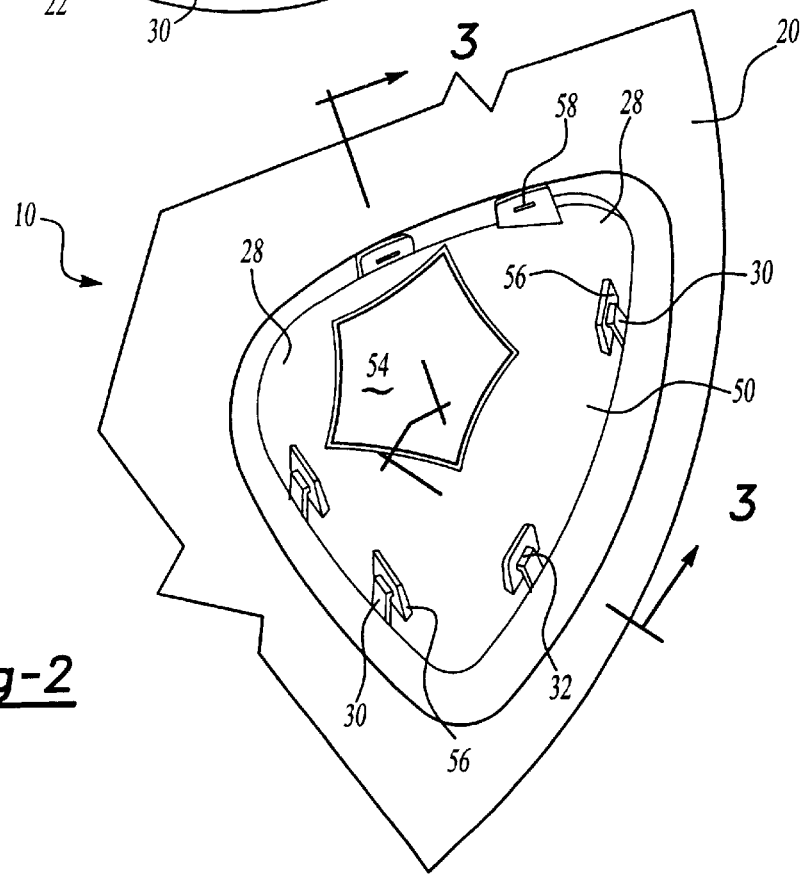
FIG. 2 is an enlarged view of a portion of the wheel cover assembly of FIG. 1, as assembled.
Figure 3:
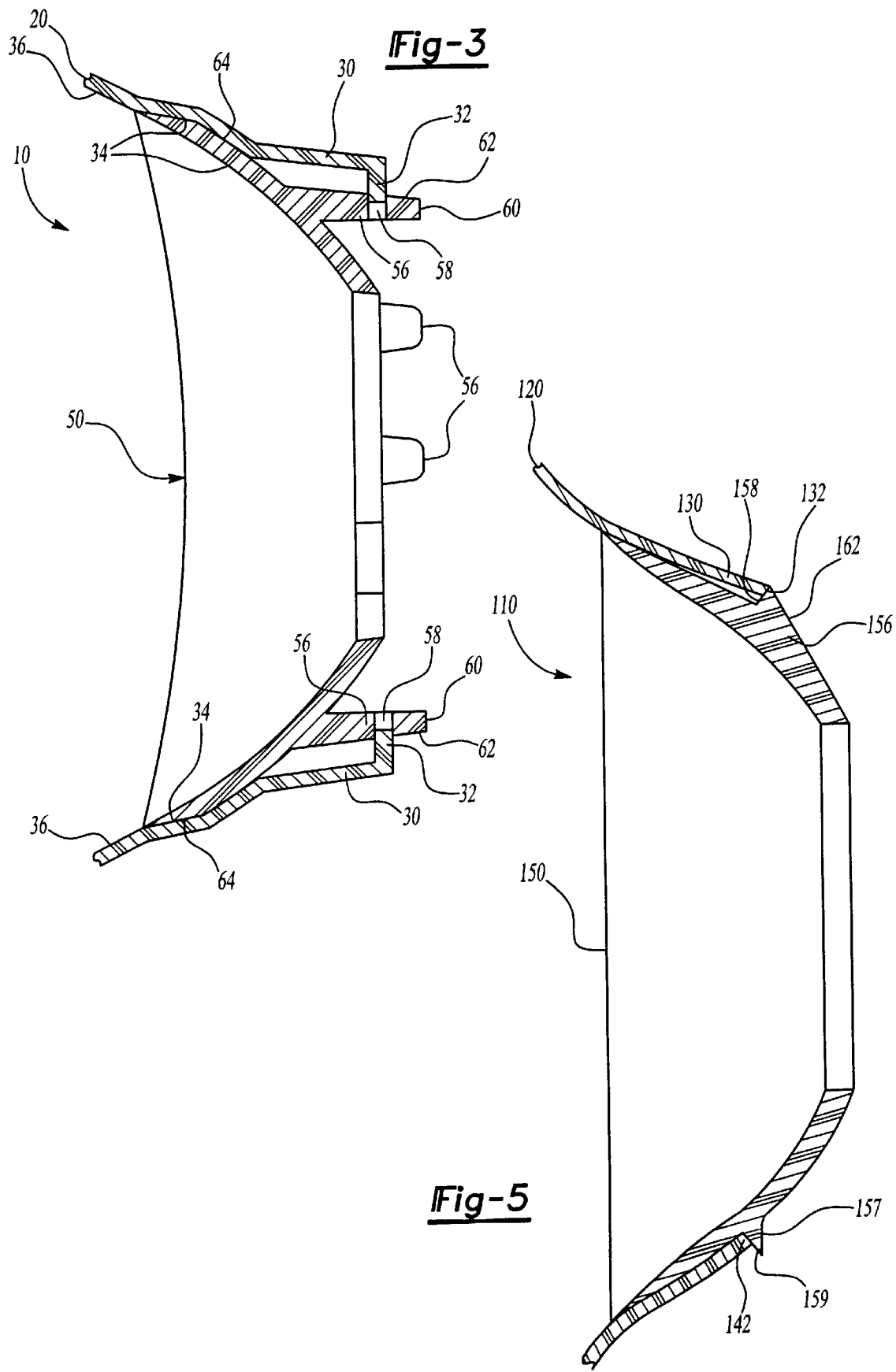
FIG. 3 is an enlarged cross-sectional view of the wheel cover assembly along line 3—3 of FIG. 2.

FIGS. 2 and 3 illustrate the pocket insert 50 fully inserted into the turbine pocket 28 of the wheel cover 20. As shown, each foot 32 of each snap tab 30 fits into an opening 58 or depression in each stirrup 56, such that the pocket insert 50 is integrally and removably fastened to the wheel cover 20 without using separate fasteners. The pocket insert 50 is integrally fastened to the wheel cover 20 in the sense that no separate fasteners are required to hold the pocket insert 50 and the wheel cover 20 together. Rather, integral features extending from each of the pocket insert 50 and the wheel cover 20 cooperate to integrally fasten to one another.

As best shown in FIG. 3, the pocket insert 50 assembles into the turbine pocket 28 such that the stirrups 56 are aligned with the snap tabs 30 and the pocket insert 50 is advanced in an inboard direction toward the turbine pocket 28. An inboard edge 60 of the stirrup 56 initially engages the corresponding foot 32 of the snap tab 30 to deflect the snap tab 30 radially outwardly with respect to the turbine pocket 28. The foot 32 of the snap tab 30 then traverses an inclined surface 62 of the stirrup 56 until the foot 32 snaps into engagement within the opening 58 in the stirrup 56. Accordingly, the snap tab 30 releasably interlocks in place within the stirrup 56 to retain the pocket insert 50 within the turbine pocket 28. One of ordinary skill in the art will recognize that an outside margin 64 of the pocket insert 50 corresponds to and overlaps an inside margin 34 of the wheel cover 20 to maintain concentricity of the pocket insert 50 within the turbine pocket 28. It is contemplated that the inside margin 34 of the wheel cover 20 could include the inside circumference of the wheel cover 20, and the outside margin 64 of the pocket insert 50 could include the outside circumference of the pocket insert 50.

The pocket insert 50 is removably fastened to the wheel cover 20 in the sense that if it becomes necessary to remove the pocket insert 50 from the turbine pocket 28, one simply pries a screwdriver between the snap tab 30 and stirrup 56 to displace the foot 32 from the opening 58 and simultaneously displace the pocket insert 50 in an outboard direction from the turbine pocket 28. This process is repeated for each snap tab 30 and stirrup 56 combination until the pocket insert 50 is freed from the wheel cover 20.

Figure 4:
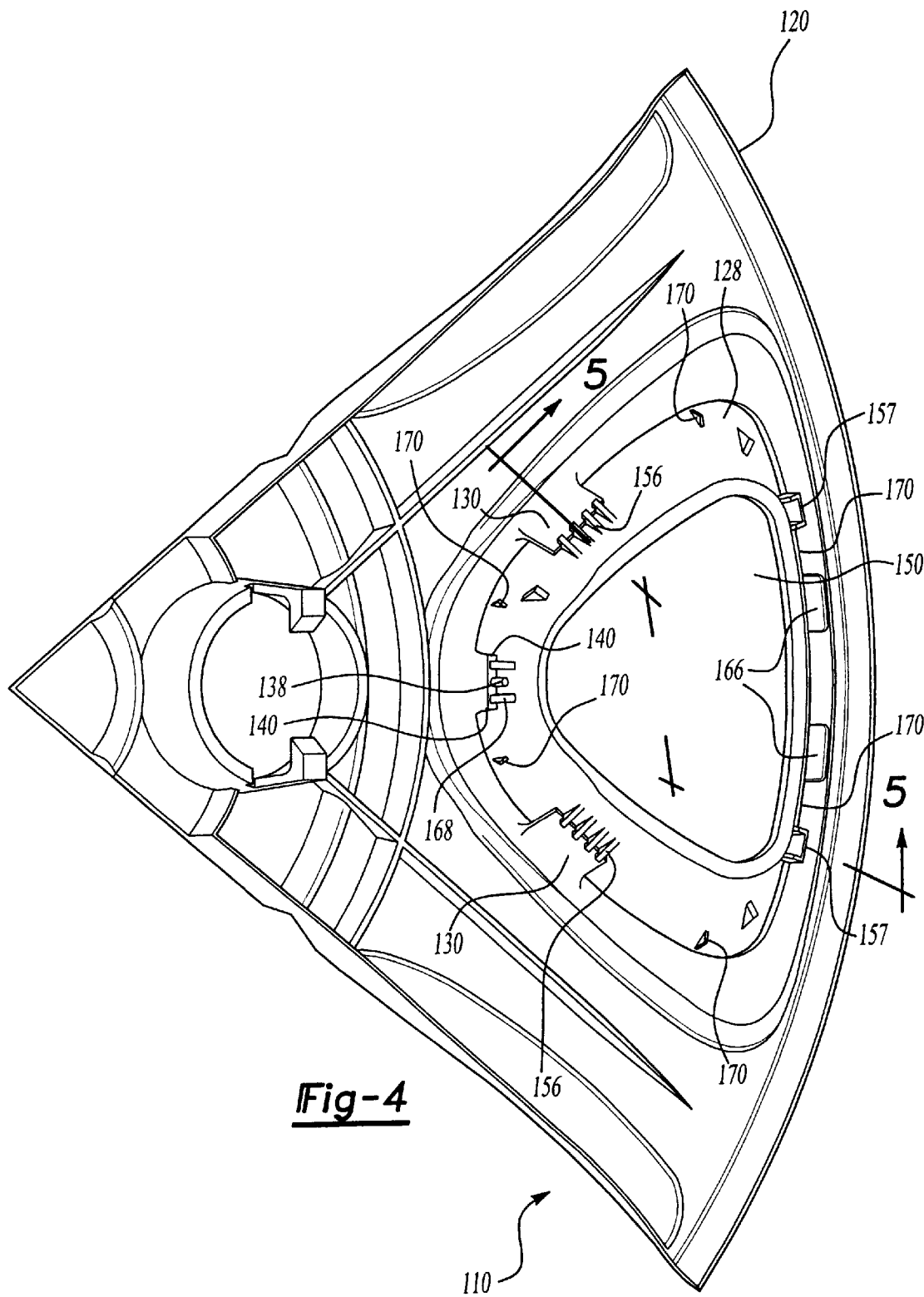
FIG. 4 is an enlarged view of a portion of an alternative embodiment of the wheel cover assembly of FIG. 1, as assembled.

FIGS. 4 and 5 illustrate the preferred method of attaching a pocket insert 150 to a wheel cover 120 to form a wheel cover assembly 110. Only the significant differences between the preferred embodiment of FIGS. 4 and 5 and the embodiment of FIGS. 2 and 3 will be described in detail, since the embodiments are otherwise the same. FIGS. 4 and 5 illustrate the pocket insert 150 fully inserted into the turbine pocket 128 of the wheel cover 120. The pocket insert 150 includes a pair of snap tabs or engagement tabs 157 that engage within corresponding cut-outs (not visible) in the periphery of the turbine pocket 128 of the wheel cover 120, such that one side of the triangular pocket insert 150 is initially located to the wheel cover 120.

The opposite sides of the turbine insert include snap-tabs or engagement wedges 156 integrally molded therein, that interlock with corresponding snap tabs or tongues 130 integrally molded with the wheel cover 120. To help pilot the pocket insert 150 within the turbine pocket 128, alignment ribs 170 are provided on the pocket insert 150 to cooperate with the inside periphery of the turbine pocket 128 and keep the pocket insert 150 centered therewithin. To further locate the pocket insert 150 to the wheel cover 120, a locating pin 138 extending from the wheel cover 120 locates between locating ribs 168, and a shoulder 140 of the wheel cover locates against corresponding surfaces of the locating ribs 168 as shown. As such, the pocket insert 150 is integrally and removably fastened to the wheel cover 120 without using separate fasteners. Rack tabs 166 are provided on the pocket insert 150 for manufacturing purposes only, wherein the rack tabs 166 are used for locating the pocket insert 150 on plating or painting rack equipment. The rack tabs 166 are designed so that they do not have to be removed before assembling the pocket insert 150 to the wheel cover 120.

FIG. 5 shows the wheel cover assembly 110 in a cross-sectional view, wherein the pocket insert 150 assembles into the turbine pocket 128 in an inboard direction toward the wheel cover 120. The engagement tabs 157 are initially introduced to corresponding cutouts 142 in the inner periphery of the turbine pockets 128 of the wheel cover 120 such that shoulders 159 of the engagement tabs 157 locate within and against the cutouts 142. Subsequently, the opposite sides of the pocket insert 150 are pressed into place against the wheel cover 120 such that the engagement wedges 156 are aligned with the tongues 130. The pocket insert 150 is assembled into the turbine pocket 128 whereby the tongues 130 are deflected radially outwardly by inclined surfaces 162 of the engagement wedges 156 until they snap into place behind shoulders 158 of the engagement wedges 156 such that ends 132 of the tongues 130 locate against the shoulders 158. Accordingly, the tongues 130 releasably interlock in place behind the engagement wedges 156 to retain the pocket insert 150 within the turbine pocket 128.

From the above, one skilled in the art will readily recognize that the present invention provides a significant improvement in providing alternative decorating schemes for a vehicle wheel. Now, it is no longer necessary to use expensive turbine pocket paint masking techniques to achieve multitudes of different decorative schemes on a vehicle wheel. Instead, a relatively inexpensive solution involves using a variety of turbine pocket inserts that are readily interchangeable with a wheel cover to achieve an unlimited number of wheel decorating themes. In applications where the decorative turbine inserts are not permanently adhesively attached to an underlying wheel or wheel cover, a vehicle owner can quickly and easily remove and replace the decorative turbine pocket inserts in order to decorate or accent the vehicle according to his or her own individual taste.

While the present invention has been described in terms of a preferred embodiment, it is apparent that other forms could be adopted by one skilled in the art. For example, the teachings of the present invention are also well suited to any decorative component for a vehicle wherein selective ornamentation is desired, such as a grille. Those skilled in the art will appreciate that other applications, including those outside of the automotive industry, are possible with this invention. Accordingly, the scope of the present invention is to be limited only by the following claims.

What is claimed is:

1. A wheel cover assembly comprising:
   a wheel cover having an outboard surface, and at least one turbine pocket circumferentially spaced therein;
   at least one insert disposed about said outboard surface of said wheel cover, said at least one insert adapted to be mounted in said at least one turbine pocket; and
   means for fastening said at least one insert in said at least one turbine pocket of said wheel cover.

2. The wheel cover assembly as claimed in claim 1, wherein said means for fastening comprises a plurality of integral snap tabs on said wheel cover and a plurality of integral snap tabs on said at least one insert, said plurality of integral snap tabs of said at least one insert releasably interlocking with said plurality of integral snap tabs of said wheel cover.

3. The wheel cover assembly as claimed in claim 1, wherein said wheel cover further comprises an array of turbine pockets in said outboard surface, each turbine pocket of said array of turbine pockets being open and defining vent openings through said wheel cover.

4. The wheel cover assembly as claimed in claim 3, further comprising an array of inserts, each insert of said array of inserts adapted to be mounted in a respective one of said array of turbine pockets in said outboard surface.

5. The wheel cover assembly as claimed in claim 1, wherein said wheel cover is chrome plated and said at least one insert is painted in contrast to said wheel cover.

6. The wheel cover assembly as claimed in claim 1, wherein said wheel cover is painted and said at least one insert is chrome plated in contrast to said wheel cover.

7. A wheel cover assembly suitable for decorating a vehicle wheel, said wheel cover assembly comprising:
   a wheel cover comprising an outboard surface and an inboard surface opposite said outboard surface, said wheel cover further comprising at least one turbine pocket in said outboard surface and an inside margin partially defining said at least one turbine pocket;
   at least one insert corresponding to and removably mounted within said at least one turbine pocket of said wheel cover, said at least one insert having an outboard surface thereon, said at least one insert having an outside margin corresponding to said inside margin of said wheel cover; and
   means for fastening said at least one insert to said wheel cover, said means for fastening being releasably engageable such that said at least one insert can be removed from said wheel cover;
   whereby said outboard surfaces of said wheel cover and said at least one insert appear distinct for purposes of aesthetic appearance.

8. The wheel cover assembly as claimed in claim 7, wherein said means for fastening comprises snap tabs disposed around said at least one turbine pocket of said wheel cover and integrally extending in an inboard direction from said inboard surface of said wheel cover, said means for fastening further comprising corresponding snap tabs disposed around said at least one insert and integrally extending in an inboard direction from said at least one insert, wherein said snap tabs of said at least one insert and said snap tabs of said at least one turbine pocket of said wheel cover interlock to fasten said at least one insert to said wheel cover.

9. The wheel cover assembly as claimed in claim 7, wherein said at least one turbine pocket has an opening therethrough to said inboard surface of said wheel cover such that said at least one turbine pocket defines a vent opening therethrough.

10. The wheel cover assembly as claimed in claim 9, wherein said at least one insert has an aperture therethrough such that said at least one insert is correspondingly open to said at least one turbine pocket of said wheel cover.

11. The wheel cover assembly as claimed in claim 7, wherein said wheel cover is chrome plated and said at least one insert is painted in contrast to said wheel cover.

12. The wheel cover assembly as claimed in claim 7, wherein said wheel cover is painted and said at least one insert is chrome plated in contrast to said wheel cover.

13. The wheel cover assembly as claimed in claim 7 wherein said wheel cover is painted one color and said at least one insert is painted another color.

14. A wheel cover assembly suitable for decorating an outboard surface of a vehicle wheel, said wheel cover assembly comprising:
   a wheel cover comprising an outboard surface and an inboard surface opposite said outboard surface, said wheel cover further comprising an array of turbine pockets in said outboard surface and an array of inside margins partially defining said array of turbine pockets, said wheel cover also comprising integral engagement features integrally extending in an inboard direction from said inboard surface;

a plurality of pocket inserts corresponding to and disposed within said array of turbine pockets of said wheel cover, each pocket insert of said plurality of pocket inserts comprising an outboard surface thereon and comprising an outside margin corresponding to each of said inside margins of said wheel cover, said plurality of pocket inserts further comprising integral engagement features integrally extending in an inboard direction therefrom and being interlocked with said integral engagement features of said wheel cover to releasably retain said plurality of pocket inserts to said wheel cover;

whereby said outboard surfaces of said wheel cover and said plurality of pocket inserts appear distinct for purposes of aesthetic appearance.

15. A wheel cover suitable for attachment to a vehicle wheel, said wheel cover comprising:

an outboard surface;

an inboard surface opposite said outboard surface;

an array of turbine pockets extending from said inboard surface to said outboard surface;

an inside margin partially defining each turbine pocket of said array of turbine pockets; and a plurality of integral engagement members extending in a direction away from said inboard surface, each turbine pocket of said array of turbine pockets having at least two integral engagement members of said plurality of engagement members located complementary with said inside margin, whereby said plurality of integral engagement members are configured to accept one or more ornamental inserts.

16. The wheel cover assembly as claimed in claim 3 further comprising an array of inserts and wherein each insert of said array of inserts has an aperture therethrough such that each insert of said array of inserts is in open communication with a respective one of said array of turbine pockets.

17. The wheel cover as claimed in claim 15 further comprising an array of inserts, each insert of said array of inserts having an outboard surface and being adapted to be mounted in a respective one of said array of turbine pockets in said outboard surface.

18. The wheel cover as claimed in claim 17 wherein said outboard surface of said wheel further comprises a first decorative treatment and further wherein said outboard surface of each of said array of inserts further comprises a second decorative treatment.

* * * * *